United States Patent [19]

Satoh

[11] Patent Number: 5,278,605
[45] Date of Patent: Jan. 11, 1994

[54] OPTICAL APPARATUS INCLUDING DIAPHRAGM DEVICE

[75] Inventor: Tatsuya Satoh, Tokyo, Japan

[73] Assignee: Canon Kabushiki Kaisha, Tokyo, Japan

[21] Appl. No.: 910,417

[22] Filed: Jul. 8, 1992

[30] Foreign Application Priority Data

Jul. 17, 1991 [JP] Japan .................................. 3-176796

[51] Int. Cl.⁵ .............................................. G03B 7/00
[52] U.S. Cl. .................................................... 354/446
[58] Field of Search ............... 354/446, 451, 452, 453, 354/455, 195.11, 271.1; 352/141; 359/739, 740; 358/225

[56] References Cited

U.S. PATENT DOCUMENTS

| | | | |
|---|---|---|---|
| 4,159,864 | 7/1979 | Yasukuni et al. | 354/195.11 X |
| 4,245,901 | 1/1981 | Karikawa et al. | 354/446 |
| 4,299,459 | 11/1981 | Mizokami | 354/452 X |
| 4,423,937 | 1/1984 | Suzuki et al. | 354/446 |
| 4,478,502 | 10/1984 | Nakai | 354/453 X |
| 4,696,560 | 9/1987 | Ogihara et al. | 354/452 X |
| 4,857,952 | 8/1989 | Fukushima et al. | 354/452 |
| 4,998,129 | 3/1991 | Watanabe et al. | 354/452 |

Primary Examiner—W. B. Perkey
Attorney, Agent, or Firm—Robin, Blecker, Daley & Driscoll

[57] ABSTRACT

An optical apparatus having a diaphragm device includes an optical system having a focal length which can be varied, a detecting circuit for detecting the focal length of the optical system, the diaphragm device having an amount of opening which can be varied by means of a motor serving as a drive source, a fixed opening being formed in the diaphragm device, a decision circuit for determining the amount of stopping-down for the diaphragm device, and a control circuit for controlling the amount of driving of the motor of the diaphragm device on the basis of a detection result provided by the detecting circuit and the amount of stopping-down determined by the decision circuit. The control circuit causes the diaphragm device to perform preliminary diaphragm driving from an initial state on the basis of the detection result provided by the detecting circuit, and also to perform stopping-down driving after the preliminary diaphragm driving on the basis of the amount of stopping-down. If the detecting circuit detects a specific focal length, the preliminary diaphragm driving is performed until the diaphragm device forms an opening which is reduced with respect to the fixed opening of the diaphragm device.

14 Claims, 6 Drawing Sheets

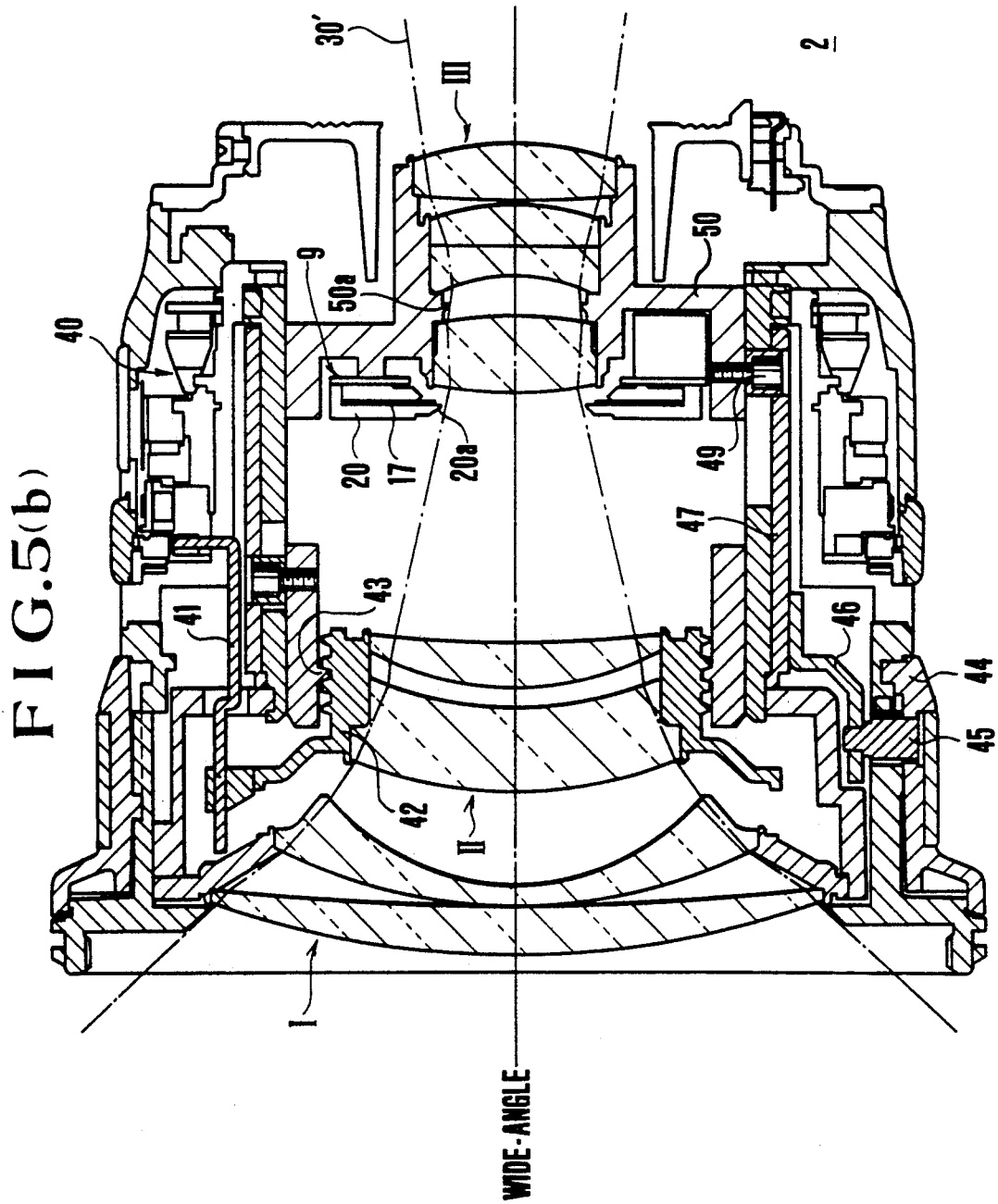

OPTICAL APPARATUS INCLUDING DIAPHRAGM DEVICE

Background of the Invention

1. Field of the Invention

The present invention relates to an optical apparatus including a diaphragm device utilizing a motor as a drive source.

2. Description of the Related Art

A zoom lens having an aperture-diameter compensating mechanism for compensating for an aperture diameter in association with a zooming operation is proposed in Japanese Laid-open Patent Application No. Hei 3-015834, and such a zoom lens has already been put into practice. The electrically-operated diaphragm device incorporated in the zoom lens is provided with a stepping motor as a diaphragm-blade driving motor, and the amount of diaphragm driving based on the result of a light measurement is obtained by computing operations. The electrically-operated diaphragm device is also provided with an aperture-diameter compensating mechanism for varying, if a zooming operation is performed, an open-aperture diameter by means of a cam on the basis of an variation due to the zooming in the focal length of a photographic optical system.

It has been found, however, that it is necessary to consider the following points regarding the zoom lens having the proposed electrically-operated diaphragm device with the aperture-diameter compensating mechanism.

1) If the zoom lens is set to a focal length near to its wide-angle end, the open-aperture diameter is defined by diaphragm blades themselves and the open-aperture diameter determines an open-aperture F number. As a result, if the zoom lens is exposed to an external impact or the like, it is possible that the diaphragm blades project into the open aperture to increase the open-aperture F number.

For this reason, it is necessary to increase the revolving power of an open-aperture signal switch (a switch for detecting whether or not the aperture is fully open) up to a resolving power equivalent to (or greater than) one cocking of the stepping motor. This leads to the disadvantage that not only a complicated open-aperture signal switch but also a large accommodating space and an increased cost are needed.

2) To compensate for the aperture diameter by means of the cam in association with a zooming operation, it is also necessary to provide the zoom ring of a lens barrel with a compensating cam. This leads to the disadvantage that the compensating cam must be provided in a limited space and an increase in cost is involved.

SUMMARY OF THE INVENTION

It is, therefore, an object of the present invention to provide an optical apparatus including a diaphragm device capable of solving the above-described disadvantages.

To achieve the above-described object, according to one aspect of the present invention, there is provided an optical apparatus including a diaphragm device capable of varying the amount of opening thereof by means of a motor serving as a drive source. In such an optical apparatus, the amount of preliminary driving of a diaphragm is varied on the basis of a variation in the focal length, so that the position at which the amount of opening of the diaphragm device reaches an aperture diameter smaller than the diameter of the fixed opening of the diaphragm device during diaphragm driving can be set as the boundary between preliminary diaphragm driving and stopping-down driving. Accordingly, even in an optical system whose open-aperture F number varies with a variation in the focal length, it is possible to cope with variations in the open-aperture F number only by the control of the motor.

The above and other objects, features and advantages of the present invention will become apparent from the following detailed description of a preferred embodiment of the present invention, taken in conjunction with the accompanying drawings.

BRIEF DESCRIPTION OF THE DRAWINGS

FIGS. 5(a) and 5(b) are diagrammatic cross-sectional views showing the zoom lens.

DETAILED DESCRIPTION OF THE PREFERRED EMBODIMENT:

A zoom lens which includes an electrically-operated diaphragm device according to a preferred embodiment of the present invention will be described below with reference to FIGS. 1 through 5(a) and 5(b).

Figure 1:
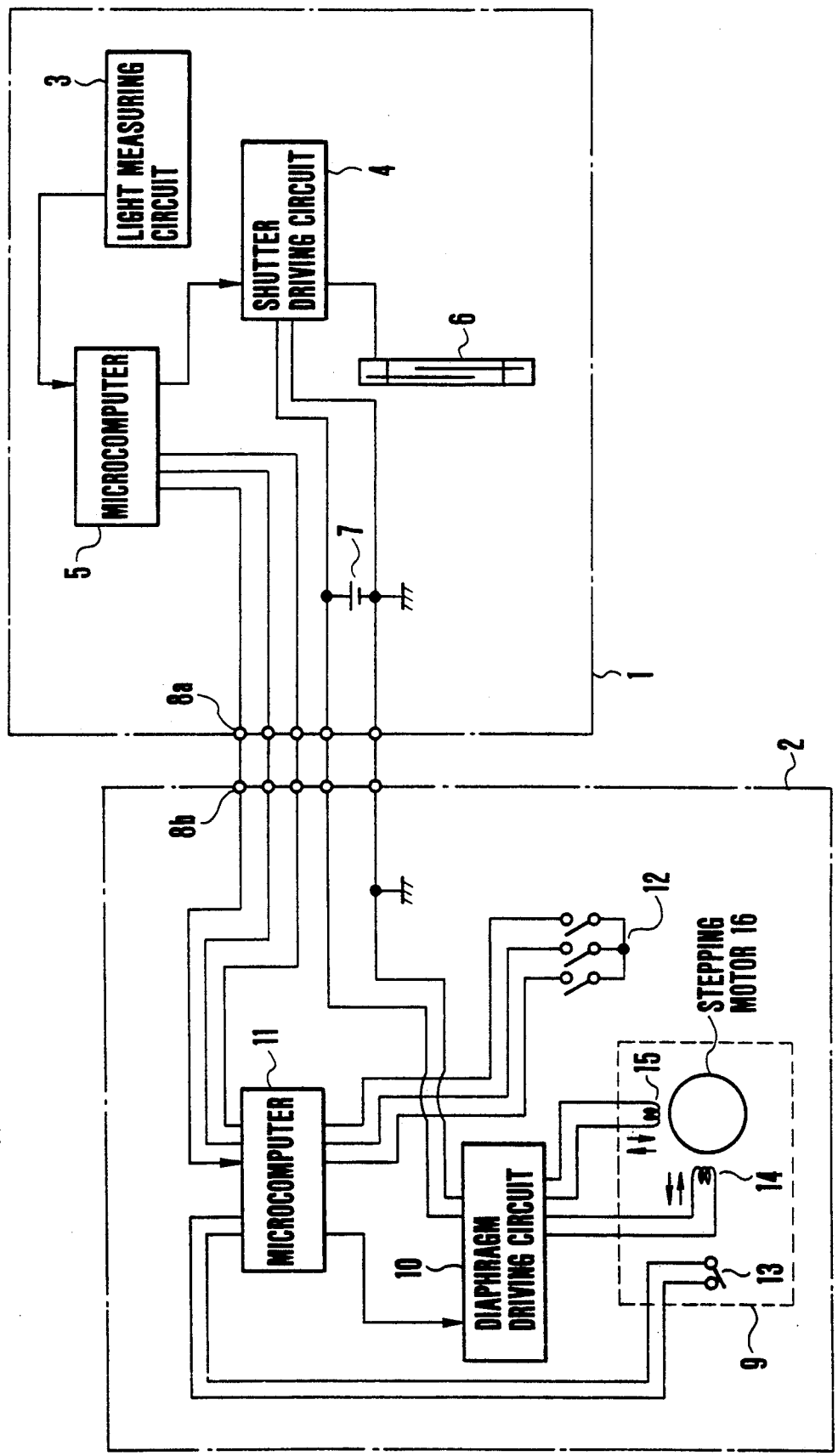
FIG. 1 is a schematic circuit diagram showing a camera body and a zoom lens which includes an electrically-operated diaphragm device according to a preferred embodiment of the present invention.

FIG. 1 is a schematic diagram showing the zoom lens provided with the electrically-operated diagram device according to the preferred embodiment of the present invention and a camera body to which the zoom lens is attached.

In FIG. 1, a block 1 represents a camera body and a block 2 represents a photographic lens removably attached to the camera body 1, and the camera body 1 and the photographic lens 2 constitute a camera system. The camera body 1 includes a light measuring circuit 3 and a shutter driving circuit 4 which is connected to a focal plane shutter 6 and to a microcomputer 5. The camera body 1 also includes a battery 7 which serves as a power source for operating the camera system, and a contact group 8a. The photographic lens 2 includes a contact group 8b which is arranged to come into contact with the contact group 8a of the camera body 1 when the attachment of the photographic lens 2 to the camera body 1 is completed.

The photographic lens 2 also includes an electrically-operated diaphragm device 9 having a diaphragm-driving stepping motor 16 built therein, and the electrically-operated diaphragm device 9 is connected to the diaphragm driving circuit 10 and also to a lens microcomputer 11 incorporated in the photographic lens 2. The photographic lens 2 also includes a zoom brush 12 for detecting the focal length of the photographic lens 2, and an open-aperture detecting switch 13 for detecting whether the amount of opening of a diaphragm by the driving of the diaphragm-driving stepping motor 16 is approximately coincident with the diameter of a fixed open aperture formed in the diaphragm device 9.

Figure 2:
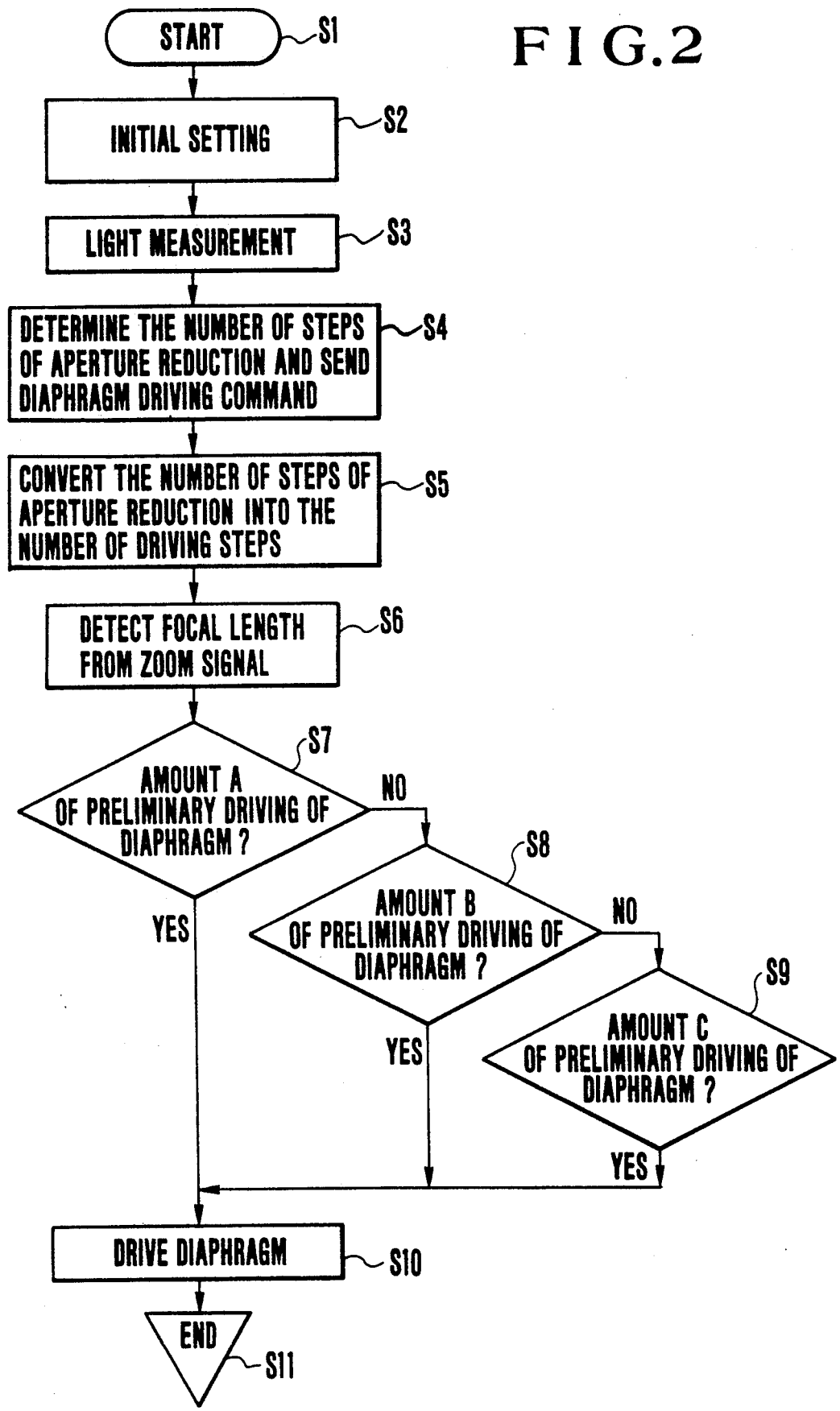
FIG. 2 is a flowchart aiding in explaining the operation of each part of both the zoom lens and the camera body.
Figure 3:
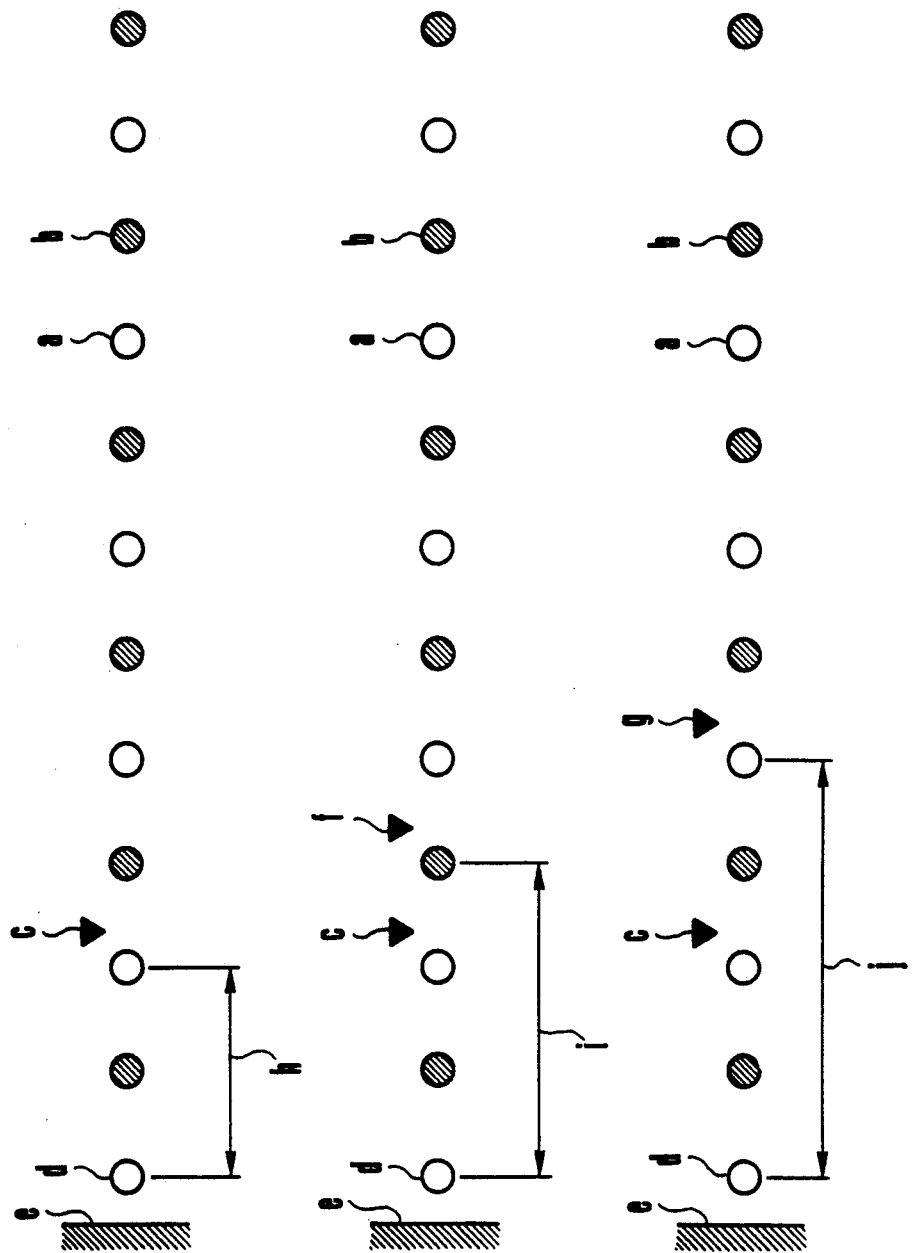
FIGS. 3(a), 3(b) and 3(c) are schematic views showing the relationship between an aperture diameter and each stop position of a 1-2 phase driving stepping motor serving as a drive source for the electrically-operated diaphragm device.

The operation of each part of the zoom lens 2 as well as the operation of each part of the camera body 1 will be described below with reference to the flowchart of FIG. 2. Referring to FIG. 2, in Step S2, each actuator and counter and others are reset. In Step S3, the amount of light is measured by the light measuring circuit 3 in the camera body 1, and in Step S4 the microcomputer 5 determines the number of steps by which the aperture of the diaphragm device 9 is to be reduced (the number of steps of aperture reduction), by performing known computations taking account of factors including a film speed, a shutter speed and an aperture value. Then, the microcomputer 5 sends a diaphragm driving command to the microcomputer 11 incorporated in the photographic lens 2. In Step S5, in response to the diaphragm driving command, the microcomputer 11 incorporated in the photographic lens 2 converts the number of steps of aperture reduction into the number of driving steps by which the diaphragm-driving stepping motor 16 is to be driven. In Step S6, the microcomputer 11 detects the focal length of the photographic lens 2 from a zoom signal outputted from the zoom brush 12, and in Step S7, S8 or S9, the microcomputer 11 determines the amount of preliminary driving of the diaphragm which corresponds to the focal length (open-aperture F number). In Step S10, it is determined in which direction of a coil 14 or a coil 15 the diaphragm-driving stepping motor 16 is to be energized by the diaphragm driving circuit 10 in accordance with the number of driving steps corresponding to [the number of steps of aperture reduction]+[the amount of preliminary driving of the diaphragm]. Thus, the diaphragm-driving stepping motor 16 can be made to run by an arbitrary amount, that is, the diameter of a specified aperture can be adjusted in accordance with the focal length (open-aperture F number).

FIGS. 3(a), 3(b) and 3(c) are schematic views showing the relationship between each stop position of the 1-2 phase driving stepping motor 16 shown in FIG. 1 and the aperture diameter of the diaphragm.

In FIGS. 3(a), 3(b) and 3(c), symbol "a" indicates a stable position where the stepping motor 16 can come to a stop without energization, that is, a 1-phase energizing position, symbol "b" indicates a position where the stepping motor 16 can be brought to a stop by simultaneously energizing the two coils 14 and 15, symbol "c" indicates a position corresponding to the diameter of the fixed open aperture formed in the electrically-operated diaphragm device 9, that is, a position corresponding to the diameter of the open aperture of the zoom lens (photographic lens) 2 which is set to a position near to a telephoto end, symbol "e" indicates a mechanical stopper position which inhibits further motion of the stepping motor 16, and symbol "d" indicates the mechanical standby position of the stepping motor 16 As shown in FIG. 3(a), the amount of preliminary driving of the diaphragm when the zoom lens 2 is set to the position near to the telephoto end is the amount indicated by an arrow "h".

Symbols "f" and "g" respectively indicate positions where the diameter of the open aperture is determined by a part (mechanical part) in a lens barrel when the zoom lens 2 is set to a position near to its middle focal length and when the zoom lens 2 is set to a position near to a wide-angle end. The amount of preliminary driving of the diaphragm when the zoom lens 2 is set to the position near to the middle focal length is the amount indicated by an arrow "i", and the amount of preliminary driving of the diaphragm when the zoom lens 2 is set to the position near to the wide-angle end is the amount indicated by an arrow "j". Such an amount "h", "i" or "j" is detected from the zoom signal outputted from the zoom brush 12 of FIG. 1.

The amount of diaphragm driving based on the result of light measurement is represented by a right-hand portion with respect to the position "c" of FIG. 3(a) if the zoom lens 2 is set to the position near to the telephoto end, by a right-hand portion with respect to the position "f" of FIG. 3(b) if the zoom lens 2 is set to the position near to the middle focal length, or by a right-hand portion with respect to the position "g" of FIG. 3(c) if the zoom lens 2 is set to the position near to the wide-angle end. Accordingly, in whichever zoom position the zoom lens 2 may be set, the diameter of the aperture reduced by the diaphragm can be accurately adjusted by detecting the amount "h", "i" or "j" of preliminary driving of the diaphragm from the zoom signal in the above-described manner.

Figure 4:
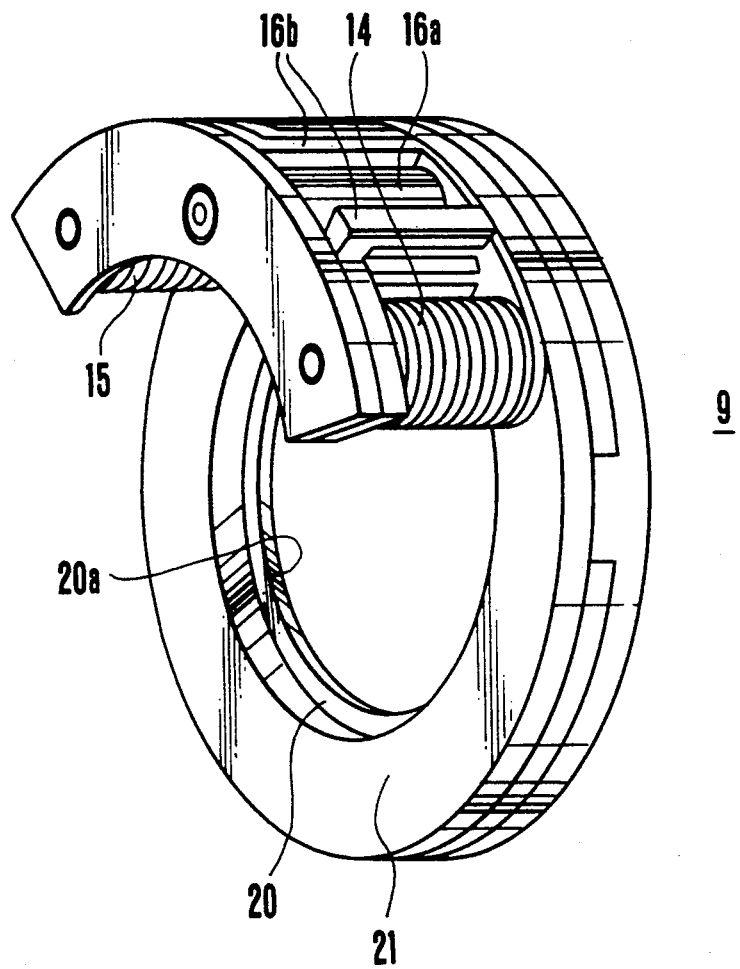
FIG. 4 is a diagrammatic perspective view showing the external appearance of the electrically-operated diaphragm device.

FIG. 4 diagrammatically shows the external appearance of the electrically-operated diaphragm device 9. The stepping motor 16 which serves as a drive source includes a rotor 16a, stators 16b, and coils 14 and 15 all of which are arranged in an approximately arcuate manner around the circumference of the electrically-operated diaphragm device 9 that is defined by two rings 20 and 21 each having an opening. Diaphragm blades 17 (refer to FIGS. 5(a) and 5(b); in FIG. 4, the diaphragm blades 17 are not shown since they are accommodated in the gap between the rings 20 and 21) move with the rotation of the rotor 16a so that the amount of opening of the diaphragm can be varied. The diameter of an opening 20a of the ring 20 defines the diameter of the fixed open aperture in the diaphragm device 9. In other words, if the diaphragm blades 17 are retracted into a large-diameter side with respect to the opening 20a, the amount of opening of the diaphragm is determined by the diameter of the opening 20a of the ring 20. If the diaphragm blades 17 project into a small-diameter side with respect to the opening 20a, the amount of opening of the diaphragm is determined by the diameter of an aperture defined by the diaphragm blades 17.

Figure 5A:
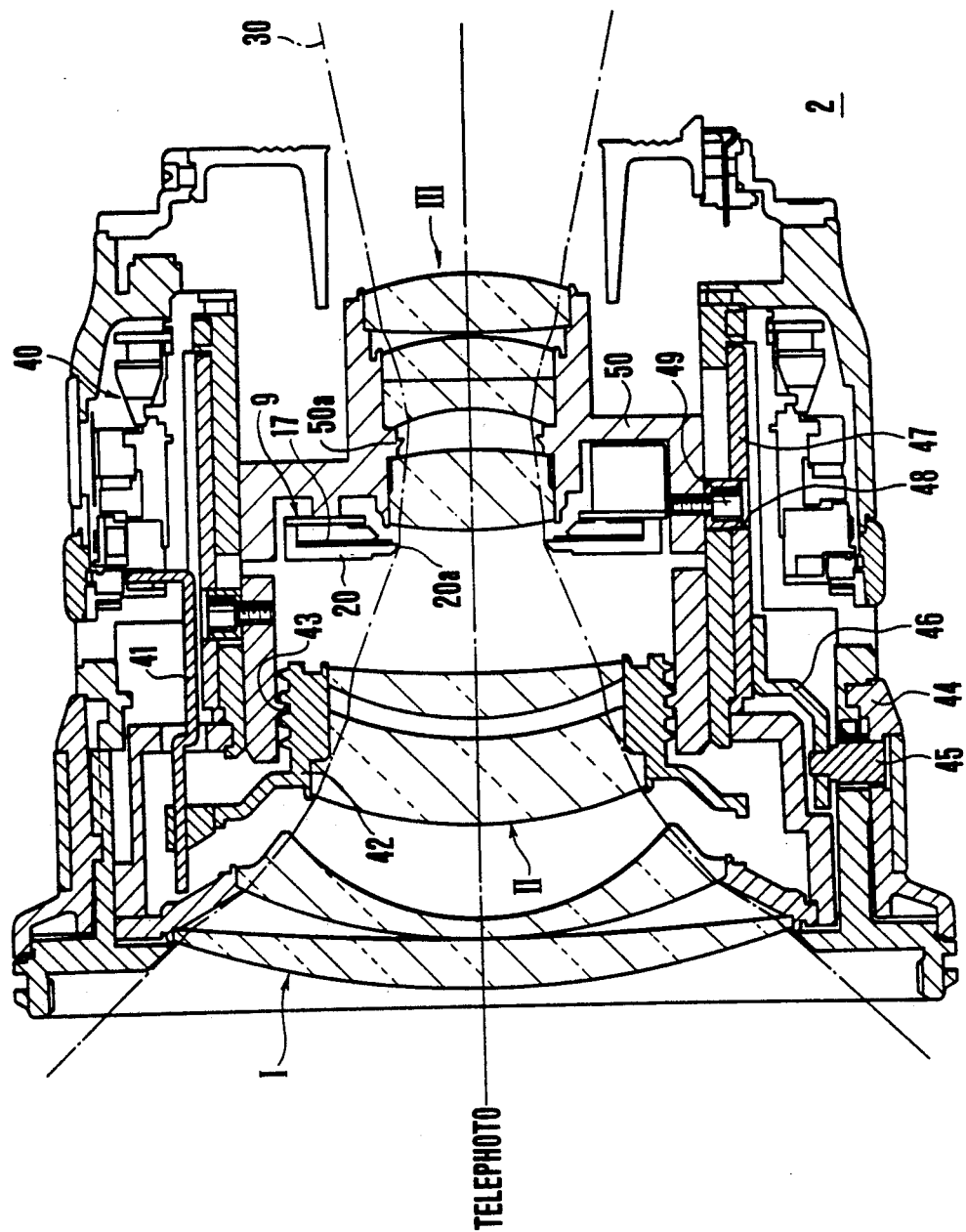

FIGS. 5(a) and 5(b) show a specific example of the photographic lens 2.

The focusing operation of the photographic lens 2 will be described below. When a transmission member 41 is rotated by the driving of an ultrasonic motor 40 which serves as a focusing drive source, a first lens holder 42 is rotated accordingly. While rotating, the first lens holder 42 moves in a direction parallel to the optical axis by means of a helicoid mechanism 43. Thus, a lens group II moves to effect focusing.

The zooming operation of the photographic lens 2 will be described below. When a zooming operating ring 44 is rotated, transmission members 45 and 46 rotate, causing a cam tube 47 to rotate. A cam follower 49 fixed to a second lens holder 50 is provided in the state being inserted in a cam groove 48 of the cam tube 47. Accordingly, with the rotation of the cam tube 47, the second lens holder 50 moves in a direction parallel to the optical axis by the amount of cam displacement of the cam groove 48. Thus, a lens group III moves to effect zooming. Although not described herein in detail, the lens group I is fixed.

FIG. 5(a) shows the state in which the photographic lens 2 is set to its telephoto end position, while FIG. 5(b) shows the state in which the photographic lens 2 is set to its wide-angle end position. As can be seen from the figures, in the case of the telephoto end setting shown in FIG. 5(a), a bundle of light rays 30 corresponding to the open-aperture F number is defined by the opening 20a of the diaphragm device 9. In the case of the wide-angle end setting shown in FIG. 5(b), a bundle of light rays 30' corresponding to the open-aperture F number is defined by a small-diameter portion 50a of the second lens holder 50. Although not described herein in detail, focal-length information is obtained by detecting the rotation of the cam tube 47 through an encoder or the like.

Further features of the present embodiment will be described below with reference to FIGS. 5(a) and 5(b).

Basically, light measurement performed immediately before an exposure operation in the camera body 1 is open-aperture light measurement. After the open-aperture light measurement is performed, the number of steps by which the amount of opening of the diaphragm device 9 is to be reduced from the open aperture for the open-aperture light measurement, is found by computations based on a light measurement output. At the time of the exposure operation, the aperture is reduced to a size corresponding to the aperture value found by the computations.

If photography is to be performed with the photographic lens 2 set to the telephoto end position shown in FIG. 5(a), since the open-aperture F number is determined by the opening 20a of the diaphragm device 9, the diaphragm blades 17 are made to perform a stopping-down operation to reduce the aperture from the opening 20a by the amount (stopping-down value) corresponding to the number of steps found by the light measurement computations. In other words, the amount of driving of the stepping motor 16 up to the position "c" shown in FIG. 3(a) is the amount "h" of preliminary driving of the diaphragm, and the amount of the subsequent driving of the stepping motor 16 corresponds to the amount of diaphragm driving for the stopping-down operation.

If photography is to be performed with the photographic lens 2 set to the wide-angle end position shown in FIG. 5(b), since the open-aperture F number is determined by the small-diameter portion 50a of the second lens holder 50, it is necessary to cause the diaphragm blades 17 to perform a stopping-down operation to reduce the aperture from a diameter which is smaller than that of the opening 20a and defines the bundle of light rays 30', by the amount (stopping-down value) corresponding to the number of steps found by the light measurement computations. In other words, the amount of driving of the stepping motor 16 up to the position "g" shown in FIG. 3(c) is the amount "j" of preliminary driving of the diaphragm, and the amount of the subsequent driving of the stepping motor 16 corresponds to the amount of diaphragm driving for the stopping-down operation. As will be understood from the above description, the amount of preliminary driving of the diaphragm varies with the variation of the focal length.

In the case of the middle-focal-length setting shown in FIG. 3(b), the position "f" which is an intermediate position between the position "c" in the case of the telephoto end setting and the position "g" in the case of the wide-angle end setting corresponds to the boundary position between the operation of the preliminary driving and the stopping-down operation.

As is apparent from the foregoing description, in accordance with the present embodiment, even if the opening diameter of a photographic optical system which defines the open aperture thereof varies for each focal length in the entire zooming range, it is possible to cope with the variation of the opening diameter by varying the amount of preliminary driving of the diaphragm. Accordingly, it is not necessary to adjust the diameter of the open aperture in response to the variation of the focal length by means of mechanical means (for example, a cam mechanism). Accordingly, it is possible to achieve an optical apparatus having a simple construction, a high shock resistance, a low cost and a small size.

What is claimed is:

1. An optical apparatus having a diaphragm device, comprising:
   (a) an optical system having a focal length which can be varied;
   (b) detecting means for detecting the focal length of said optical system;
   (c) said diaphragm device having an amount of opening which can be varied by a motor serving as a drive source, a fixed opening being formed in said diaphragm device;
   (d) a decision circuit for determining an amount of stopping-down for said diaphragm device; and
   (e) a control circuit for controlling an amount of driving of said motor of said diaphragm device on the basis of a detection result provided by said detecting means and said amount of stopping-down determined by said decision circuit, said control circuit causing said diaphragm device to perform preliminary diaphragm driving from an initial state on the basis of said detection result provided by said detecting means, and also to perform stopping-down driving after said preliminary diaphragm driving on the basis of said amount of stopping-down, wherein if said detecting means detects a specific focal length, said preliminary diaphragm driving is performed until said diaphragm device forms an opening which is reduced with respect to said fixed opening of said diaphragm device.

2. An optical apparatus according to claim 1, further comprising an open-aperture detecting switch for detecting whether said diaphragm device has reached an amount of opening approximately coincident with the amount of said fixed opening.

3. An optical apparatus according to claim 1, wherein if said focal length detected by said detecting means belongs to a telephoto side, said control circuit specifies, as said preliminary diaphragm driving, driving of said diaphragm device from said initial state to said fixed opening, while if said focal length detected by said detecting means belongs to a wide-angle side, said control circuit specifies, as said preliminary diaphragm driving, driving performed from said initial state until said diaphragm device forms the opening which is reduced with respect to said fixed opening.

4. An optical apparatus according to claim 2, wherein if said focal length detected by said detecting means belongs to a telephoto side, said control circuit specifies, as said preliminary diaphragm driving, driving of said diaphragm device from said initial state until actuation of said open-aperture detecting switch, while if said focal length detected by said detecting means belongs to a wide-angle side, said control circuit specifies, as said preliminary diaphragm driving, driving of said diaphragm device from said initial state until a state reached by said diaphragm device by further driving continued after the actuation of said open-aperture detecting switch.

5. An optical apparatus according to claim 1, wherein said control circuit includes a microcomputer, said microcomputer controlling the amount of said preliminary diaphragm driving on the basis of the detection result provided by said detecting means.

6. An optical apparatus according to claim 5, wherein said control circuit controls the amount of said preliminary diaphragm driving by varying the amount of step driving of said motor.

7. An optical apparatus according to claim 1, wherein said decision circuit determines said amount of stopping-down on the basis of a light-measurement result provided by a light measuring circuit.

8. A lens barrel attachable to a camera body and provided with a diaphragm device, comprising:
   (a) an optical system having a focal length which can be varied;
   (b) detecting means for detecting the focal length of said optical system;
   (c) said diaphragm device having an amount of opening which can be varied by a motor serving as a drive source, a fixed opening being formed in said diaphragm device;
   (d) information receiving means for receiving information on an amount of stopping-down for said diaphragm device from said camera body; and
   (e) a control circuit for controlling an amount of driving of said motor of said diaphragm device on the basis of a detection result provided by said detecting means and said information on said amount of stopping-down received by said information receiving means, said control circuit causing said diaphragm device to perform preliminary diaphragm driving from an initial state on the basis of said detection result provided by said detecting means, and also to perform stopping-down driving after said preliminary diaphragm driving on the basis of said information on said amount of stopping-down, wherein if said detecting means detects a specific focal length, said preliminary diaphragm driving is performed until said diaphragm device forms an opening which is reduced with respect to said fixed opening of said diaphragm device.

9. A lens barrel according to claim 8, further comprising an open-aperture detecting switch for detecting whether said diaphragm device has reached an amount of opening approximately coincident with the amount of said fixed opening.

10. A lens barrel according to claim 8, wherein if said focal length detected by said detecting means belongs to a telephoto side, said control circuit specifies, as said preliminary diaphragm driving, driving of said diaphragm device from said initial state to said fixed opening, while if said focal length detected by said detecting means belongs to a wide-angle side, said control circuit specifies, as said preliminary diaphragm driving, driving performed from said initial state until said diaphragm device forms the opening which is reduced with respect to said fixed opening.

11. A lens barrel according to claim 9, wherein if said focal length detected by said detecting means belongs to a telephoto side, said control circuit specifies, as said preliminary diaphragm driving, driving of said diaphragm device from said initial state until actuation of said open-aperture detecting switch, while if said focal length detected by said detecting means belongs to a wide-angle side, said control circuit specifies, as said preliminary diaphragm driving, driving of said diaphragm device from said initial state until a state reached by said diaphragm device by further driving continued after the actuation of said open-aperture detecting switch.

12. A lens barrel according to claim 8, wherein said control circuit includes a microcomputer, said microcomputer controlling the amount of said preliminary diaphragm driving on the basis of the detection result provided by said detecting means.

13. A lens barrel according to claim 12, wherein said control circuit controls the amount of said preliminary diaphragm driving by varying the amount of step driving of said motor.

14. A lens barrel according to claim 8, wherein said information receiving means includes a lens contact arranged for contact with a camera contact provided on said camera body, said information receiving means receiving said information on said amount of stopping-down from said camera body through said lens contact.

* * * * *